2,582,554

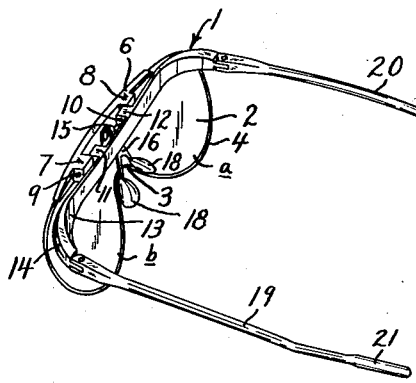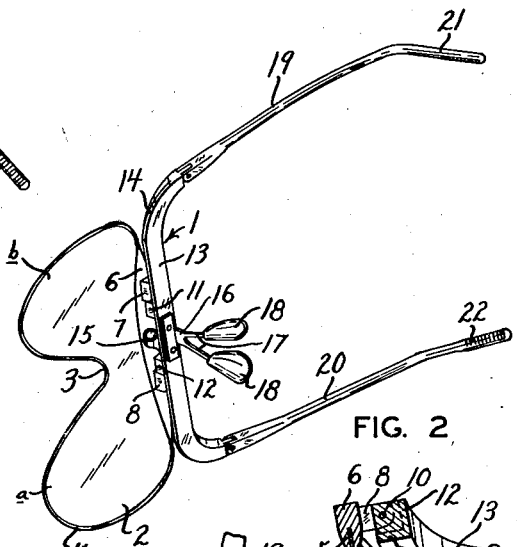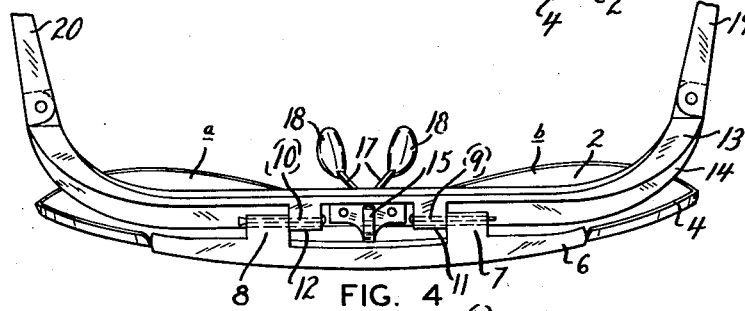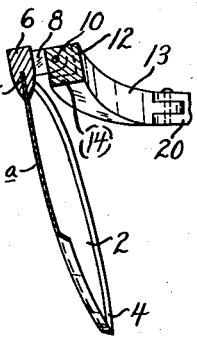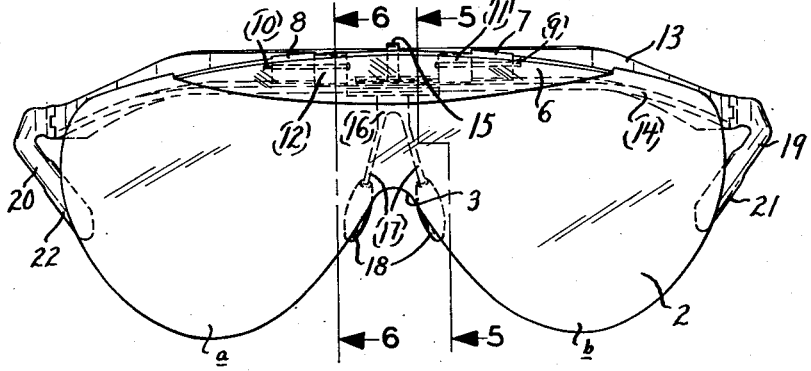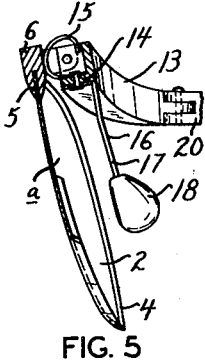
INVENTOR
WILLIAM A. MENDELSOHN
ATTORNEY Patented Jan. 15, 1952

UNITED STATES PATENT OFFICE 2,582,554

SUNGLASSES

William A. Mendelsohn, Chicago, Ill.

Application August 9, 1947, Serial No. 767,812

3 Claims. (Cl. 2—12)

This invention relates in general to certain new and useful improvements in sunglasses.

It is a primary object of the present invention to provide sunglasses comprising an eye-covering section or sun screen adapted to be swung optionally into, or out of, the line of vision of the wearer.

It is an additional object of the present invention to provide sunglasses of the type stated in which the eye-covering member or sun screen can optionally be swung into a number of angular positions with respect to the line of vision of the wearer to provide either a sun visor or light filter, as may be desired, and which may be quickly and conveniently moved into such different positions.

It is a further object of the present invention to provide sunglasses of the type stated which are extremely light in weight and comfortable during actual use by the wearer.

It is likewise an object of the present invention to provide sunglasses of the type stated which can be readily and conveniently adjusted to fit the bridge of the nose of the wearer and are uniquely constructed in this respect so as to be almost universally adaptable to the facial measurements of any type of user.

With the above and other objects in view, my invention resides in the novel features of form, construction, arrangement, and combination of parts presently described and pointed out in the claims.

In the accompanying drawing:

Figure 1 is a perspective view of sunglasses constructed in accordance with and embodying the present invention;

Figure 2 is a perspective view looking upwardly;

Figure 3 is a front view;

Figure 4 is a fragmentary top plan view;

Figure 5 is a transverse sectional view taken along line 5—5 of Figure 3; and

Figure 6 is a transverse sectional view taken along line 6—6 of Figure 3.

Referring now in more detail and by reference characters to the drawing, which illustrates a preferred form of my invention, 1 designates sunglasses comprising a protecting plate or sun screen 2 fabricated of molded plastic and provided in its central portion with an upwardly extending tapered recess 3 for clearance of the wearer's nose, and roughly dividing the plate 2 into two sections a, b. The periphery of said plate 2 is provided with a short rearwardly projecting flange 4 which gives rigidity to said plate 2 and prevents easy tearing thereof. The central portion of the upper transverse margin of the plate 2 is suitably retained with a groove 5 of a support member 6. Said support member 6, fabricated preferably of Bakelite or similar hard plastic, is provided on its rear surface with two knuckle joints 7, 8, which are swingably mounted in hinge formation by pintles 9, 10, upon co-operating knuckle joints 11, 12, integrally formed upon a frame member 13 also fabricated of Bakelite or similar hard plastic, and provided along its lower transverse margin with a forwardly presented flange 14. The ends of said flange 14 appropriately curve to conform to the rearwardly curved ends of said frame member 13. Mounted on the flange 14 between the knuckle joints 11, 12, is an adjustable arcuate friction leaf 15 formed of flexible metal, whereby desired degrees of tension may be effected on the support member 6 when swinging in relation to the frame member 13, as will presently more fully appear.

Secured dependingly to the underside of the flange 14, in alignment with the recess 3 of the plate 2, when in eye-protective or downward position, is a bifurcated metal nose bridge 16 having two spaced legs 17 provided upon their outer ends with plastic nose pads 18. The nose bridge 16 is preferably formed of metal which is capable of being bent to permit convenient adjustment of the bridge 16 to comfortably conform to the nose structure of the wearer. Hingedly connected to the ends of the frame member 13, and extending rearwardly therefrom, are side pieces or temples 19, 20, having downwardly and inwardly bent terminal sections 21, 22, respectively, designed to rest on the ear and grip the head of the wearer.

The arcuate friction leaf 15 can be bent inwardly, outwardly, upwardly, or downwardly, as circumstances may require, so as to impose a greater or lesser degree of friction against the rear face of the support member 6. This adjustment may be made to increase or decrease the amount of effort required to swing the eye-covering or sun screen 2 into any desired position and may also be employed to tighten the amount of frictional tension applied to the support member 6 to compensate for wear between the several parts. It will, of course, be apparent that a conventional spectacle frame containing lenses or light-filtering oculars may be substituted for the glare shield or sun screen 2, and, similarly, lenses, high-powered magnifiers, binoculars, binocular optical systems or a shatter-proof transparent protective shield may be mounted upon the frame bar 6 in lieu of the glare shield or sun screen 2.

It should be understood that changes and modifications in the form, construction, arrangement, and combination of the several parts of the sunglasses may be made and substituted for those herein shown and described without departing from the nature and principle of my invention.

Having thus described my invention, what I claim and desire to secure by Letters Patent is:

1. Spectacles comprising a frame-member, temples operatively connected to the frame-member, a support member swingably mounted in the frame, an optical element mounted in and depending from the support member for optional movement into and out of the line of vision of the wearer, and an arcuate spring leaf mounted at one end on the frame-member and having an outwardly presented surface, said support member bearing slidably against the outwardly presented surface of the spring leaf and traversing said surface as the support member is swung upwardly and downwardly for holding the support-member at any selected position relative to the frame-member within the limits of swinging movement of said support-member.

2. Spectacles comprising a frame member, temples operatively connected to the frame member, a forwardly projecting flange provided on said frame member, first knuckle joints provided on said flange, a support member, second knuckle joints provided on the rear surface of said support member and swingably mounted in hinged formation with said first knuckle joints by means of pintles, an optical element mounted in and depending from the support member for optional movement into and out of the line of vision of the wearer, and an arcuate friction spring leaf mounted at one end on the flange intermediate said first knuckle joints, said spring leaf having an outwardly presented surface, said support member bearing slidably against the outwardly presented surface of the spring leaf and traversing said surface as the support member is swung upwardly and downwardly around the pintles whereby the support member may be maintained at any selected position relative to the frame member within the limits of swinging movement of said support member.

3. Spectacles comprising a frame member, temples operatively connected to the frame member, a forwardly projecting flange provided on said frame member, first spaced knuckle joints provided on said flange and being equi-distant from the center thereof, a support member, second spaced knuckle joints provided on the rear surface of said support member and swingably mounted in hinged formation with said first knuckle joints, an optical element mounted in and depending from the support member for optional movement into and out of the line of vision of the wearer, a manually deformable friction spring leaf secured at one end on the flange intermediate said first knuckle joints, said leaf curving upwardly and forwardly thence rearwardly and downwardly, being free at its other end and having an outwardly presented surface, said support member bearing slidably against the outwardly presented surface of the spring leaf and traversing said surface as the support member is swung upwardly and downwardly around the pintles whereby uniform tension is applied to the support member at any selected position intermediate the limits of swinging movement of said support member, and a deformable bifurcate nose engaging bridge-member mounted in and depending from the frame member, said bridge-member having spaced legs with pads on their lower ends.

WILLIAM A. MENDELSOHN.

REFERENCES CITED

The following references are of record in the file of this patent:

UNITED STATES PATENTS

| Number | Name | Date |
|---|---|---|
| 588,642 | Hoffman | Aug. 24, 1897 |
| 1,238,396 | Elwood | Aug. 28, 1917 |
| 1,715,612 | McCulloch | June 4, 1929 |
| 2,060,127 | Schofield | Nov. 10, 1936 |
| 2,126,697 | Bigelow | Aug. 16, 1938 |
| 2,265,704 | Stein et al. | Dec. 9, 1941 |

FOREIGN PATENTS

| Number | Country | Date |
|---|---|---|
| 61,369 | Norway | Sept. 4, 1939 |
| 200,635 | Great Britain | July 19, 1923 |
| 305,513 | Great Britain | Feb. 6, 1929 |
| 390,685 | Great Britain | Apr. 13, 1933 |
| 645,124 | France | June 26, 1928 |